United States Patent [19]
Lin et al.

[11] Patent Number: 5,579,230
[45] Date of Patent: Nov. 26, 1996

[54] VEHICLE SPEED ESTIMATION FOR ANTILOCK BRAKING USING A CHASSIS ACCELEROMETER

[75] Inventors: William C. Lin, Troy; David M. Sidlosky, Huntington Woods, both of Mich.

[73] Assignee: General Motors Corporation, Detroit, Mich.

[21] Appl. No.: 712,287

[22] Filed: Jun. 10, 1991

[51] Int. Cl.$^6$ ........................................... G06F 7/70
[52] U.S. Cl. .................. 364/426.02; 364/426.04; 364/426.01; 303/158; 303/182; 303/196; 180/197; 73/117; 73/105; 280/707
[58] Field of Search .................. 364/424.05, 426.02, 364/424.1, 426.05, 426.01, 426.04, 426.03; 303/21 A, 21 B, 100, 156, 182, 192, 158, 196, 183; 180/197; 73/117, 105, 862; 280/707

[56] References Cited

U.S. PATENT DOCUMENTS

| | | | |
|---|---|---|---|
| 3,709,567 | 1/1973 | Van Ostrom et al. | 303/21 |
| 3,854,779 | 12/1974 | Skoyles et al. | 303/21 |
| 3,953,080 | 4/1976 | Bremer | 303/21 |
| 3,972,568 | 8/1976 | Fleischer | 303/21 |
| 4,442,708 | 4/1984 | Gable et al. | 73/117 |
| 4,653,816 | 3/1987 | Lin | 303/106 |
| 4,685,746 | 8/1987 | Matsuda | 303/106 |
| 4,807,133 | 2/1989 | Shimanuki et al. | 364/426.02 |
| 4,825,371 | 4/1989 | Hoashi et al. | 364/426.02 |
| 4,826,206 | 5/1989 | Immega | 280/711 |
| 4,832,415 | 5/1989 | Shinomiya | 303/100 |
| 4,964,047 | 10/1990 | Matsuda | 364/426.02 |
| 4,974,163 | 11/1990 | Yasuno et al. | 364/426.02 |
| 5,058,020 | 10/1991 | Matsuda | 364/426.02 |
| 5,075,855 | 12/1991 | Sugasawa et al. | 364/424.05 |
| 5,193,062 | 3/1993 | Murase et al. | 364/426.02 |

*Primary Examiner*—Kevin J. Teska
*Assistant Examiner*—Jacques H. Louis-Jacques
*Attorney, Agent, or Firm*—Howard N. Conkey

[57] ABSTRACT

Before braking occurs the speed of non-driven wheels is monitored and averaged to determine vehicle speed and an integrator is initialized with that speed. Acceleration is periodically calculated from the vehicle speed, stored in a ring buffer and averaged. The output of a chassis accelerometer is also sampled during the same periods and stored in a similar ring buffer and averaged. Accelerometer bias due to slope or drift is determined as the difference of the two averaged accelerations. The noise level of the accelerometer bias is determined by filtering and rectification. After braking occurs, the accelerometer output is corrected by subtracting the bias and the noise and is then used to continuously update the integrator output to provide an estimate of vehicle speed during braking.

3 Claims, 5 Drawing Sheets

VEHICLE SPEED ESTIMATION FOR ANTILOCK BRAKING USING A CHASSIS ACCELEROMETER

FIELD OF THE INVENTION

This invention relates to a method and apparatus for producing a vehicle speed estimation for use in antilock brake control.

BACKGROUND OF THE INVENTION

In antilock braking it is important to have good vehicle speed information as a reference against which wheel speeds during braking can be compared whereby the amount of wheel slip is determined. While sensors on non-driven wheels of a vehicle provide such information when brakes are not applied, such information does not represent vehicle speed when brakes are applied. Elegant methods such as radar speed sensing have been proposed but the relatively high expense prohibits its use. Accordingly, practical antilock systems rely on inexpensive vehicle speed estimation techniques.

It is well known to use a chassis accelerometer to determine vehicle acceleration and integrate its output to get a measure of vehicle speed but the accelerometer is subject to drift as well as to the gravitational effect when the vehicle is on a slope. Thus it is also well known that it is very difficult but crucial to estimate the accelerometer reference level or bias prior to braking so that the integration can remain stable when the vehicle is braking on a slope.

SUMMARY OF THE INVENTION

It is therefore an object of the invention to provide a method and apparatus for a precise and time-efficient way of estimating vehicle speed using a chassis accelerometer. Another object is to provide such measurement capability using a ring buffer and averaging filter in either a hardware or software implementation.

The invention is carried out in a vehicle having an antilock brake controller, non-driven wheels with speed sensors, a brake application sensor, and a chassis accelerometer affected by inclination, by the method of estimating vehicle speed for antilock brake control comprising the steps of: sensing the state of brake application; sensing vehicle acceleration; periodically sensing wheel speed; before brake application, determining vehicle speed from wheel speed, periodically calculating acceleration from wheel speed, filtering the calculated acceleration and the sensed vehicle acceleration with the same time delay at all frequency components and the same frequency response characteristics for each filtering task, and determining accelerometer bias from the difference of the filtered calculated acceleration and the filtered sensed acceleration; after brake application, subtracting the accelerometer bias from the sensed vehicle acceleration to obtain a corrected acceleration, and estimating vehicle speed by integrating the corrected acceleration with the determined vehicle speed as the initial speed value.

The invention is further carried out by an apparatus for estimating speed for a vehicle antilock brake control, comprising: means for sensing speed of a non-driven vehicle wheel; means responsive to wheel speed for producing a vehicle speed signal; means for periodically calculating vehicle acceleration data from the wheel speed and storing the calculated accelerometer data; a chassis accelerometer for measuring vehicle acceleration and responsive to slope as well for providing measured acceleration data; means for sampling and storing measured acceleration data; finite impulse response filter means for filtering the measured and the calculated acceleration data, and having the same time delay at all frequency components for each set of data; means for subtracting the filtered calculated acceleration from the filtered measured acceleration data to yield an accelerometer reference; means for subtracting the accelerometer reference from the measured acceleration to yield a corrected acceleration; and integration means responsive to the vehicle speed signal for initializing the integrator output to the calculated vehicle speed upon brake application and responsive to the corrected acceleration for estimating vehicle speed after brake application.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
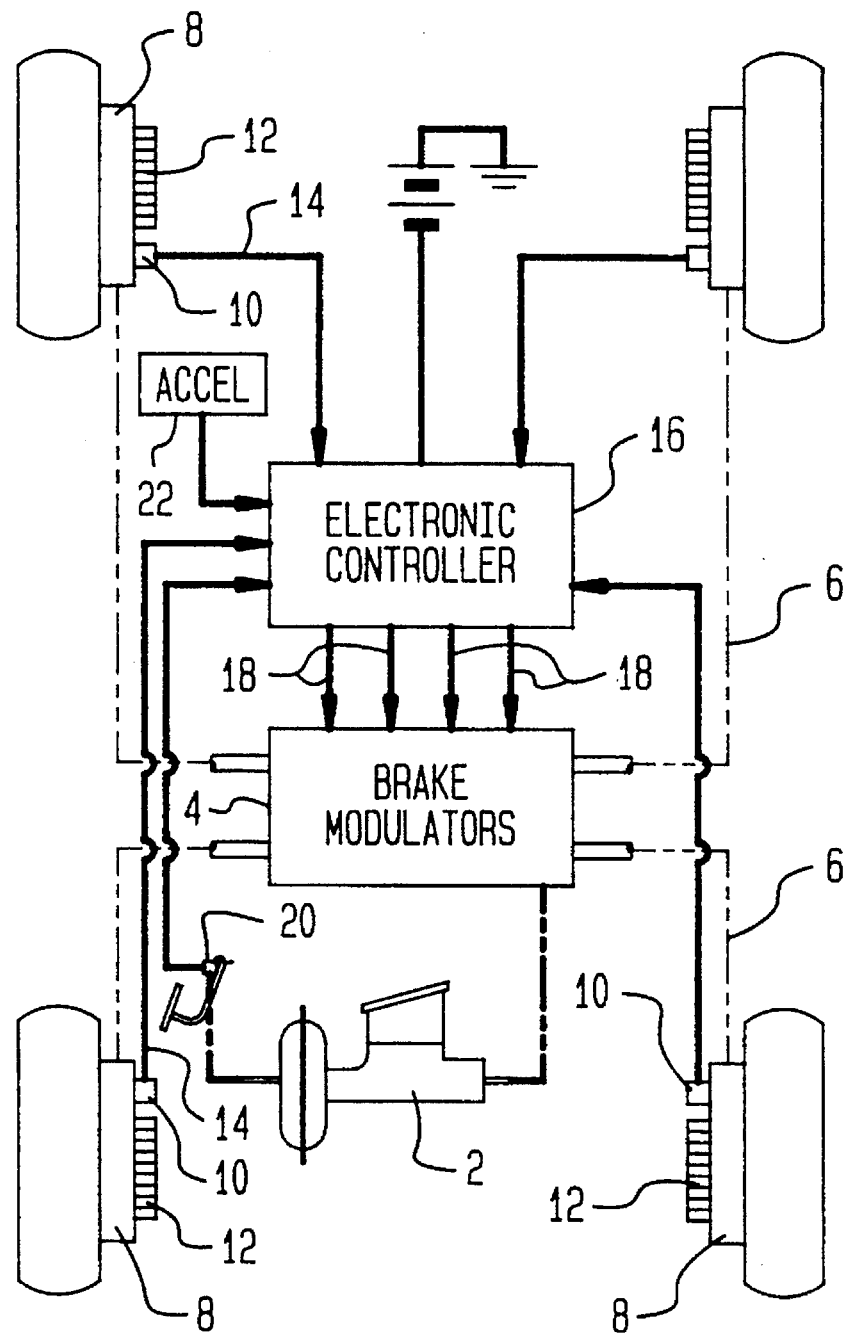
FIG. 1 is a schematic diagram of an antilock braking system for utilizing the invention.

FIG. 1 illustrates the vehicle brake system. A hydraulic boost unit 2 couples master-cylinder pressure to brake modulators 4 which supply brake pressure via brake lines 6 to each wheel brake 8. The construction and operation of the modulators is more clearly set forth in the above-mentioned U.S. Pat. No. 4,881,784. A wheel speed sensor 10 on each brake adjacent a tone wheel 12 is connected by conductors 14 to an electronic controller 16 which is programmed to supply a modulator control signal via conductors 18 to each of the modulators 4. A discrete brake application sensor 20 such as a switch responsive to brake pedal movement and a chassis accelerometer 22 also provide input signals to the controller 16.

Figure 2:
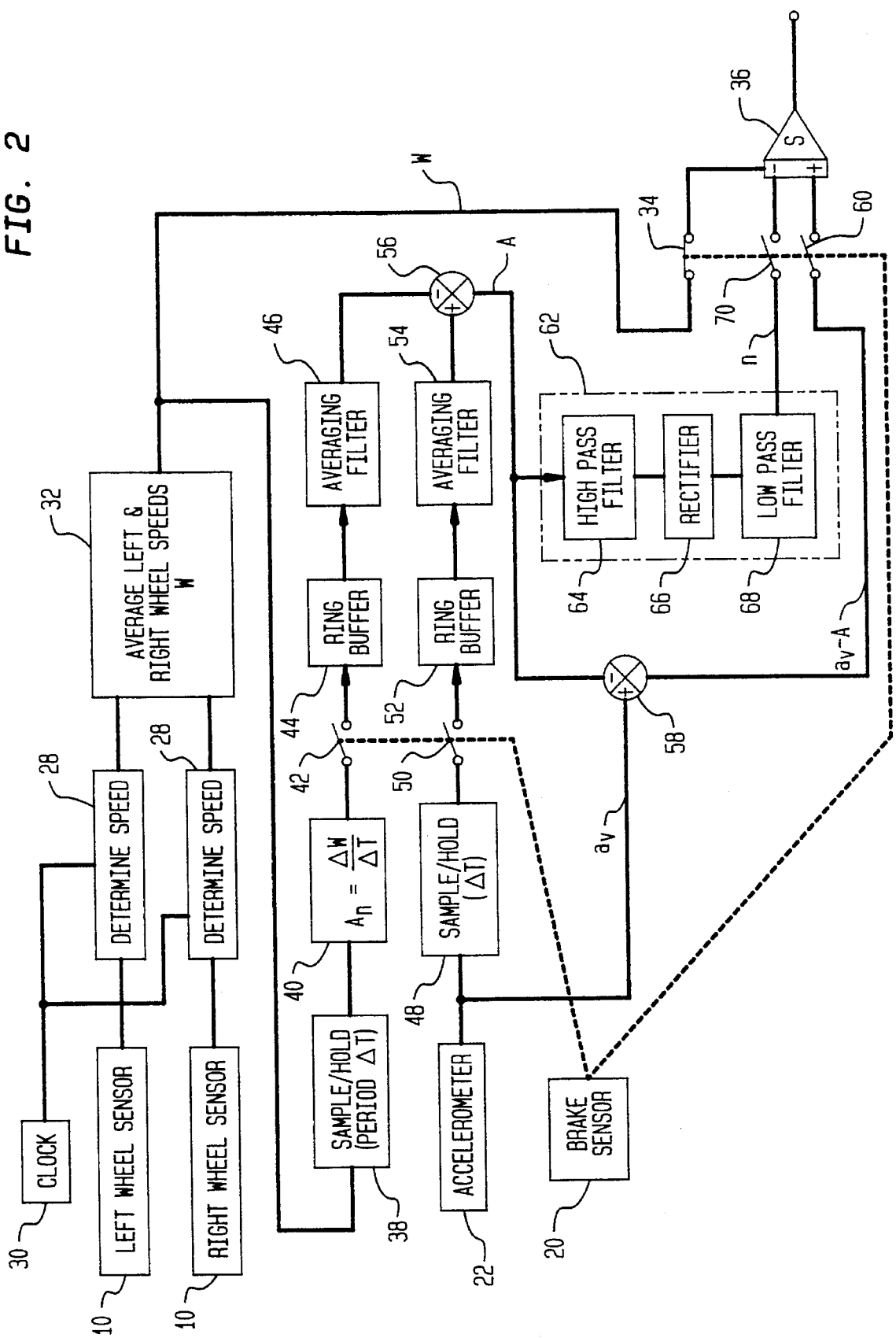
FIG. 2 is a schematic diagram of a hardware embodiment of vehicle speed estimating apparatus according to the invention.

The controller includes an arrangement for measuring vehicle speed by monitoring the speed of non-driven wheels when brakes are not applied and then estimating the vehicle speed after the brakes are applied. This function can be carried out in discrete hardware using either analog or digital circuitry or by software controlled calculations in a computer. FIG. 2 shows a hardware implementation which also illustrates the method of speed estimation. Sensors 10 on left and right non-driven wheels produce pulses at a rate proportional to the respective wheel speeds and the speed of each wheel is determined in circuits 28 by counting pulses from a clock 30 in each interval between pulses and dividing some calibration constant by the count. The left and right wheel speeds are then averaged by an averaging circuit 32. The resulting average wheel speed W is fed through a normally closed switch 34 to the reset input of an integrator 36 to maintain the integrator output at the value of the speed W while the switch 34 is closed. The brake sensor 20 controls the switch 34 and opens the switch when the brakes are applied.

The average speed W is also applied to a sample and hold circuit 38 which samples the average speed each sampling period delta-T. The wheel acceleration is determined in a differentiator 40 by calculating the change of average speed delta-W in each sampling period. The calculated acceleration is passed through a normally closed switch 42 (controlled by brake sensor 20) to a ring buffer 44 which stores many acceleration samples, say 250 samples, and is continuously updated by replacing the oldest sample with the newest sample. Using the ring-buffer data structure allows quick updates and minimal execution time in manipulating the data to be filtered. This eases the computer burden for real time signal processing. An averaging filter 46 determines the average of the ring buffer 44 contents. The output av of the chassis accelerometer 22 is also sampled in each period delta-T by a sampled and hold circuit 48 and each measured acceleration sample is passed through a normally closed switch 50 (controlled by brake sensor 20) to a ring buffer 52 like the buffer 44 and the contents are averaged by an averaging filter 54. The average of the wheel acceleration is subtracted from the average of the measured acceleration at a summing junction 56 to obtain the difference which is accelerometer reference or bias A. This bias value A is the accelerometer error due to the vehicle being on a slope or due to drift in the accelerometer. A corrected value of acceleration is determined by subtracting the value A from the accelerometer output av at a summing junction 58. The corrected value of the measured acceleration is coupled through a normally open switch 60 to the positive input of the integrator 36. A noise estimator 62 determines the nominal noise n in the accelerometer bias A. The estimator 62 includes a high pass filter 64, a rectifier 66 and a low pass filter 68 in series which filter the signal A, and rectify and low pass filter the result to obtain a noise value. The noise n is subtracted from the corrected value of measured acceleration by coupling it through the normally open switch 70 to the negative input of the integrator 36.

In operation, when the brakes are not applied, the switches 34, 42, and 50 are closed so that the average speed W is coupled to the integrator 36 to hold the integrator output at the average speed value. During the same period, the average values of the wheel acceleration and of the accelerometer output, the accelerometer bias A, and the noise estimate n are continually calculated. When the sensor 20 determines that the brakes are applied, the switches 42 and 50 are opened to effectively freeze the values of accelerometer bias A and noise n. The switch 34 is then opened and switches 60 and 70 are closed so that the integrator output is initially set at the wheel speed W and will thereafter vary according to the integrated value of the accelerometer output as corrected by the accelerometer bias A and the noise estimate n, thereby affording a reliable estimate of the vehicle speed during braking.

It is important to compensate for the noise on the accelerometer bias A so that the estimated vehicle speed is not inflated due to noise. As an alternate to adaptively estimating the noise value by the circuit 62, a predetermined constant estimate of noise may be used for the same purpose.

The use of averaging filters 46 and 54 or another type of finite impulse response filter rather than the commonly used infinite impulse response filter is important because this process calls for the comparison between the two signals which are filtered, and it is crucial to make sure that the time delays incurred during the filtering process of each signal is the same for all the frequency content. Otherwise, when one signal is subtracted from another at a certain time instant, some magnitude of the filtered value, which comes from a different frequency component and is supposed to be contained in the output of the filter at another time instant can cause an error in the difference of the wanted frequency contents. That error, in turn, leads to an erroneous estimation of the accelerometer reference value and to a failure to correctly estimate speed. The averaging filter and other finite impulse response filters have a unique feature that the time delays at all frequency components are identical and the use of such a filter is a key to the success of good estimation of the accelerometer reference A.

As set forth in the above-mentioned U.S. Pat. No. 4,881, 784 the controller has a ROM which contains the instructions necessary to implement the algorithm diagrammed in FIGS. 3–5. In describing the functions of the algorithm, references to tasks which have been detailed in flow diagram function blocks are designated by <nn>, where nn is the block reference number.

Figure 3:
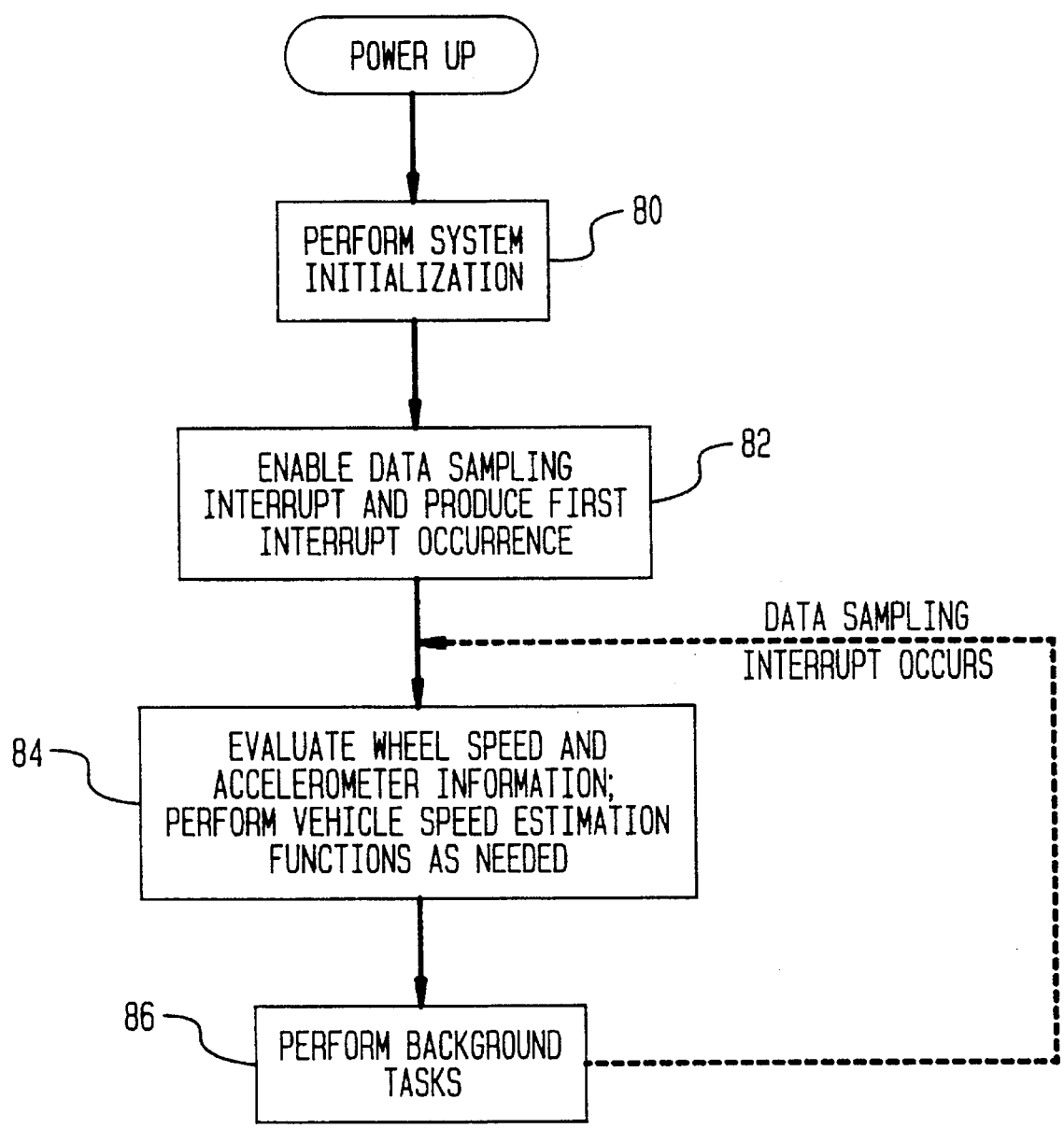
FIGS. 3, 4 and 5 are flowcharts detailing the software implementation of the vehicle estimation method, according to the invention.

When the antilock system is powered up, via the vehicle ignition circuit or other means, the controller 16 will begin executing the instructions coded in ROM. As shown in FIG. 3, the controller 16 will first perform system initialization <80>, which entails clearing registers, initializing specified RAM variables to calibrated values, stabilizing voltage levels, and other basic functions of the digital computer. Once the system has been initialized, the controller 16 will enable the data sampling interrupt <82>. The data sampling interrupt provides a means for processing the input data from the sensors every 2 msec.

Once a data sampling interrupt has occurred, the controller 16 proceeds through the major loop referred to as the "data sampling" loop. During the data sampling loop, the controller performs vehicle speed estimating tasks <84> for each wheel and then background tasks <86>. The background tasks consist of diagnostic self-check activities and communication with other vehicle controllers or service tools. All of these data sampling tasks are performed once every data sampling interrupt.

Figure 4:
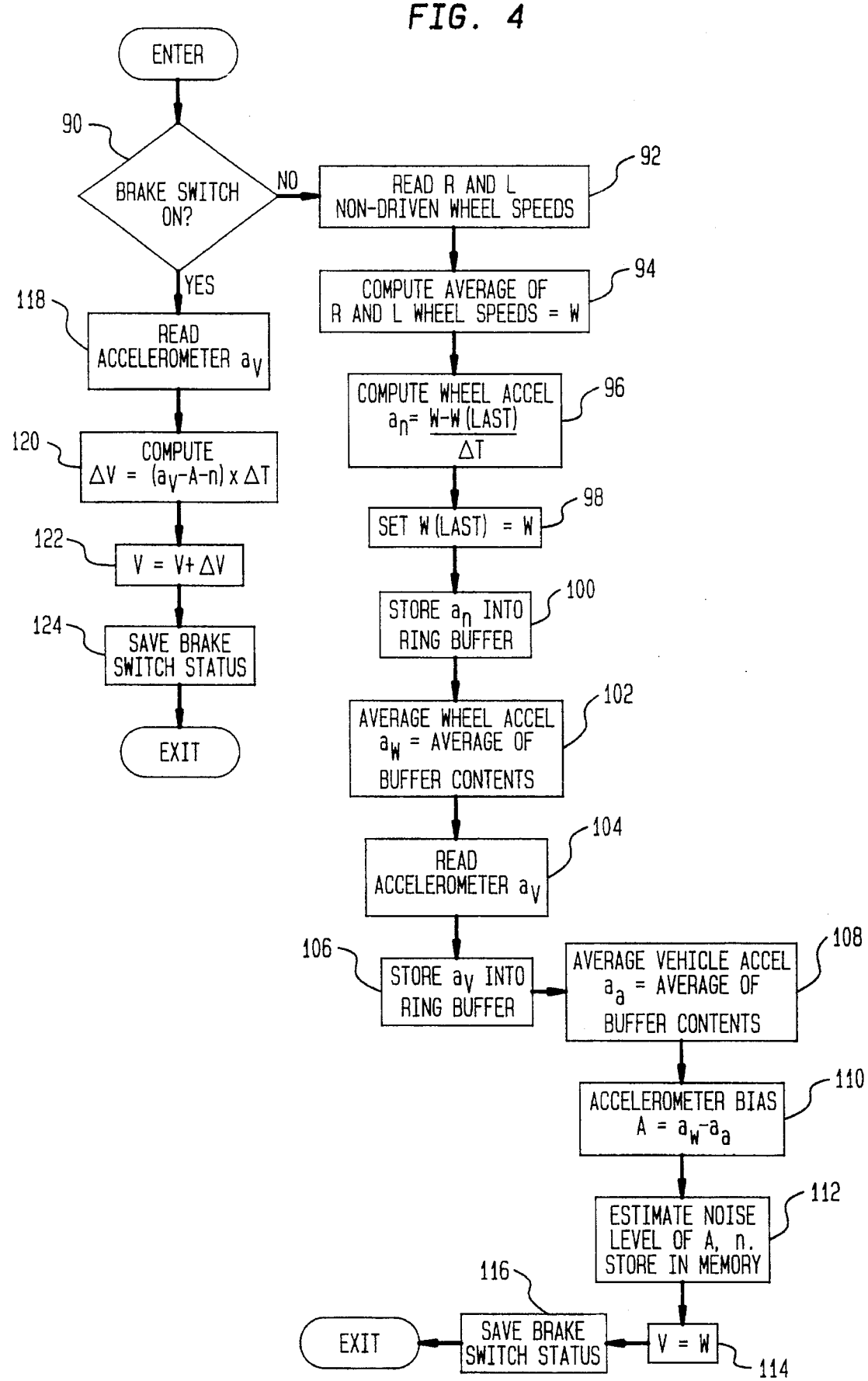

The routine for estimating wheel speed is depicted in the flowchart of FIG. 4. If the brake switch is not on <90>, right and left non-driven wheel speeds are read <92>, the average of the right and left wheel speeds W is computed <94>, wheel acceleration $a_n$ is computed for the most recent period delta-T on the basis of the difference between the current speed W and the previously calculated speed W(last) <96>, and the value of W(last) is set equal to W <98>. The computed value of $a_n$ is stored in a memory configured as a ring buffer, replacing the oldest value in the buffer <100>, and the buffer contents are averaged to obtain the average wheel acceleration $a_w$ <102>. Next the accelerometer output $a_v$ is sampled <104>, stored into a ring buffer <106>, and the buffer contents are averaged to obtain the average vehicle acceleration $a_a$ <108>. The accelerometer bias A is determined from the difference of the average wheel acceleration and the average vehicle acceleration $a_a$ <110>, the noise level n of A is estimated <112> by a routine described below (FIG. 5), estimated vehicle speed V is set equal to the average wheel speed W <114>, and the off status of the brake switch is saved <116> by setting a status flag. If at block 90 the brake switch is on, the accelerometer output is read to obtain $a_v$ <118> and the change of estimated velocity delta-V is calculated as the product of the period delta-T and the vehicle acceleration $a_v$ corrected for accelerometer bias A and the noise estimate n <120>. Then the estimated velocity is updated by adding delta-V to the previous value of v <122> and the brake switch status is saved <124> by resetting the status flag.

Figure 5:
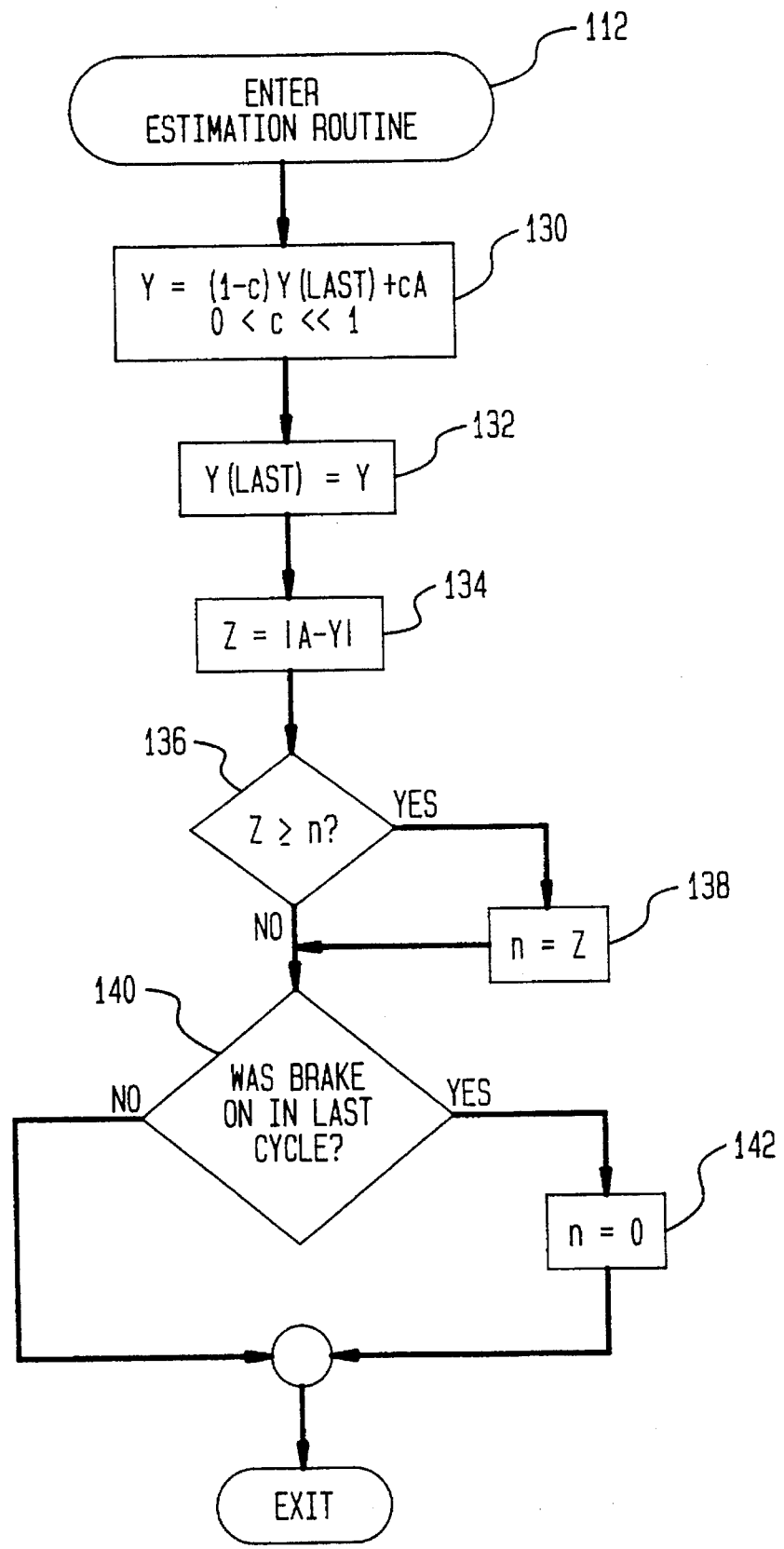

The noise estimation routine 112 is shown in FIG. 5. High pass filtering is accomplished by choosing a constant c which is much smaller than 1, e.g. 0.001, and calculating a value y=(1−c)y(last)+cA <130>, updating the value of y(last) <132>, and setting z equal to the absolute value of the difference of A and y <134>. The peak of the filtered value is determined by setting the noise estimate n equal to z <138> if z is greater than or equal to n <136>. To initialize the value of n when the routine 112 is run just after the brake application ceased, the value of n is set to zero <142> if the brake was on in the last cycle <140> according to the state of the flag set in block 16 or 124.

Thus by running the vehicle speed estimation routine frequently, say at 2 msec intervals the speed estimate V is often updated for use by the main loop of the brake controller.

The embodiments of the invention in which an exclusive property or privilege is claimed are defined as follows:

1. In a vehicle having wheels with wheel speed sensors providing a measure of wheel speed, wheel brakes for braking said wheels, a brake application sensor providing an indication of operation of said wheel brakes for braking said vehicle, and a chassis accelerometer providing a measure of vehicle acceleration that is offset from actual vehicle acceleration due to vehicle inclination, a method of estimating vehicle speed during operation of said brakes for braking said vehicle, the method comprising the steps of:

prior to said brake application sensor providing said indication of operation of said wheel brakes, (A) determining actual vehicle speed as represented by said measure of wheel speed provided by said wheel speed sensors, (B) determining actual vehicle acceleration from said determined actual vehicle speed, and (C) determining a difference between said determined actual vehicle acceleration and said measure of vehicle acceleration provided by said chassis accelerometer, said difference comprising an accelerometer bias, and while said brake application sensor provides said indication of operation of said wheel brakes, (A) subtracting said accelerometer bias from said measure of vehicle acceleration provided by said chassis accelerometer to obtain a corrected measured vehicle acceleration and (B) estimating vehicle speed by integrating said corrected measured vehicle acceleration from an initial vehicle speed value equal to a last determined actual vehicle speed prior to said indication of operation of said wheel brakes.

2. In a vehicle having wheels with speed sensors providing a measure of wheel speed, wheel brakes for braking said wheels, a brake application sensor providing an indication of operation of said wheel brakes for braking said vehicle, and a chassis accelerometer providing a measure of vehicle acceleration that is offset from actual vehicle acceleration due to vehicle inclination, a method of estimating vehicle speed during operation of said brakes for braking said vehicle, the method comprising the steps of:

prior to said brake application sensor providing said indication of operation of said wheel brakes, (A) determining actual vehicle speed as represented by said measure of wheel speed provided by said wheel speed sensors, (B) determining actual vehicle acceleration from said determined actual vehicle speed, (C) filtering each of said determined actual vehicle acceleration and said measure of vehicle acceleration so that time delays associated with said step of filtering are the same for each of said filtered actual vehicle acceleration and said filtered measure of vehicle acceleration at all frequency components of said determined actual vehicle acceleration and said measure of vehicle acceleration, and (D) determining a difference between said filtered actual vehicle acceleration and said filtered measure of vehicle acceleration, said difference comprising an accelerometer bias, and while said brake application sensor provides said indication of operation of said wheel brakes, (A) subtracting said accelerometer bias from said measure of vehicle acceleration provided by said chassis accelerometer to obtain a corrected measured vehicle acceleration and (B) estimating vehicle speed by integrating said corrected measured vehicle acceleration from an initial vehicle speed value equal to a last determined actual vehicle speed prior to said indication of operation of said wheel brakes.

3. An apparatus for estimating vehicle speed during vehicle braking, comprising:

means for sensing wheel speed of at least one vehicle wheel;

a chassis accelerometer for measuring vehicle acceleration, said measured vehicle acceleration being offset from an actual vehicle acceleration due to vehicle inclination;

a brake sensor for detecting vehicle braking; and a computer coupled to said means for sensing speed, said chassis accelerometer and said brake sensor and being programmed to:

before detection of vehicle braking, (A) determine actual vehicle speed as represented by said sensed wheel speed, (B) compute an actual vehicle acceleration value from said actual vehicle speed for each of consecutive sampling periods and store a last predetermined number of computed actual vehicle acceleration values in memory, (C) sample a value of said measured vehicle acceleration in each of said consecutive sampling periods and store said last predetermined number of sampled values of measured vehicle acceleration in memory, (D) average said stored actual vehicle acceleration values, (E) average said stored values of measured vehicle acceleration, and (F) determine a difference between said averages, said difference comprising an accelerometer bias, and during detection of vehicle braking, (A) subtracting said accelerometer bias from said measured vehicle acceleration to obtain a corrected measured vehicle acceleration and (B) estimating vehicle speed by integrating said corrected measured vehicle acceleration from an initial vehicle speed value equal to a last determined actual vehicle speed prior to detection of vehicle braking.

* * * * *